R. C. BIERBOWER.
ELECTRICAL TESTING DEVICE.
APPLICATION FILED JUNE 11, 1918.
1,349,655.
Patented Aug. 17, 1920.
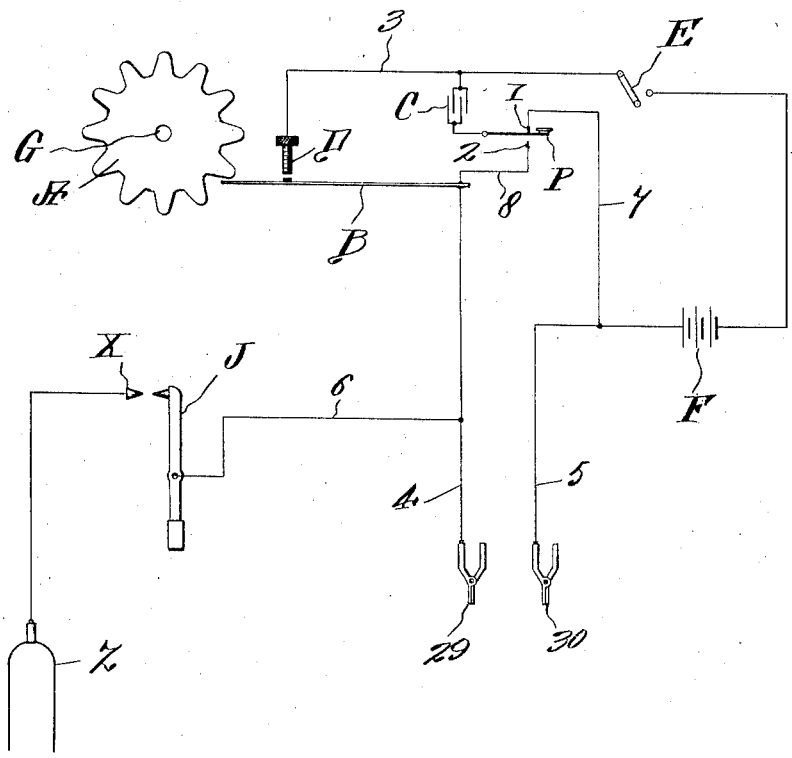
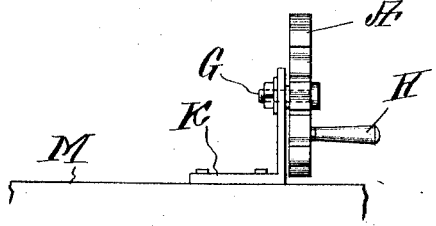
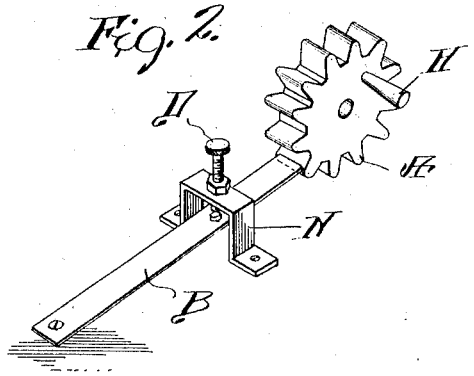
Witness
Edwin J. Beller.
Inventor
Richard C. Bierbower.
by Wilkinson & Giusta.
Attorneys

UNITED STATES PATENT OFFICE.

RICHARD C. BIERBOWER, OF SAN ANTONIO, TEXAS, ASSIGNOR TO TESTALL ELECTRIC MANUFACTURING CO., OF SAN ANTONIO, TEXAS, A CORPORATION OF TEXAS.

ELECTRICAL TESTING DEVICE.

1,349,655.  Specification of Letters Patent.  Patented Aug. 17, 1920.

Application filed June 11, 1918. Serial No. 239,454.

*To all whom it may concern:*

Be it known, that I, RICHARD C. BIERBOWER, a citizen of the United States, residing at San Antonio, in the county of Bexar and State of Texas, have invented certain new and useful Improvements in Electrical Testing Devices; and I do hereby declare the following to be a full, clear, and exact description of the invention, such as will enable others skilled in the art to which it appertains to make and use the same.

The present invention relates to improvements in electrical testing devices, and has more particular reference to an improved instrument for use in the testing of high tension coils and high tension armatures.

Broadly considered the invention consists in providing an improved testing device which includes a spark gap or other indicator adapted to be connected in circuit with the secondary coil of the instrument to be tested, in combination with a primary circuit adapted to be connected to the primary coil of the instrument to be tested, and which primary circuit includes an interrupter whereby high tension current may be induced in the instrument's secondary winding, which high tension current will evince itself at the spark gap or indicator and which will thus show the condition of the coils.

It is one object of my present invention to provide an improved mechanical circuit interrupter which is possessed of numerous advantages in testing work over electrical vibrators as hereinafter more fully described.

It is a further aim of the present invention to provide for the testing of the condensers which are contained within the high tension coils and armatures, and for this purpose I provide a condenser in the primary circuit of the testing instrument with connections whereby the same may be normally ineffective but capable of being substituted in effect for the condenser contained in the high tension coils and armatures and by conducting tests in which the condenser is first out of effect and then brought into effect and observing the spark in both instances the condition of the condenser contained in said high tension coils and armatures may be readily ascertained.

In the accompanying drawings forming a part of this application, and in which similar reference symbols indicate corresponding parts in the several views:

Figure 1 shows a diagram of an improved electrical testing device drawn according to my present invention.

Fig. 2 is a perspective view of the mechanical vibrator I prefer to employ; and

Fig. 3 is an end elevational view of a portion of said vibrator.

Referring now more particularly to the accompanying drawings wherein but a single embodiment of the present invention is illustrated, F designates a battery or other source of current which is included in a primary circuit 3, 4, 5, which contains the switch E, the interrupter B, and the test clips 29 and 30; the latter forming terminals for said primary circuit 4, 5, through which the circuit is adapted to be attached to the terminals of the primary coil of the instrument to be tested.

At B is shown a vibrator consisting of a spring arm adapted to make contact with an adjustable contact screw D. The vibrator B is connected to the wire 4 and screw D to the wire 3, thus placing the same directly in the primary circuit. On an arbor G a wheel A having a toothed periphery is adapted to be rotated, motion being derived by power applied at the handle H. The teeth of the wheel A alternately depress and release the vibrator spring B, thus making and breaking contact with screw D.

The arbor G is preferably supported in an angle bracket K secured to an instrument board M by means of which the other parts of the testing device are also supported. The spring contact arm B vibrates in an inverted U-shaped guide N which is also fastened to the board M and carries the contact screw D which is threaded and adjustable therein for the purpose of imposing the required tension on the vibrator spring B.

A condenser C is normally placed in parallel with the source of current F by means of the switch P engaging against the contact 1 of a wire 7. A contact 2 at the end of a wire 8, which latter connects to the vibrator B and wire 4, is also adapted to receive the switch P when depressed, whereby the condenser C may be placed in multiple with or thrown across the vibrator.

6 is a lead connected between the side 4 of the primary circuit and the adjustable member J of an indicator or spark gap, the other member X thereof being connected to a spring yoke or test clip Z, through which the spark gap or indicator may be connected to the secondary coil of the instrument to be tested.

The operation of the improved device is substantially as follows:

The spring test clips 29 and 30 are connected one to each primary terminal of the high tension armature or coil to be tested. The spring yoke Z is placed over the slip or collector ring of armature or connected to high tension terminal of coil. When the switch E is closed, the circuit is as follows: The current from the battery F flows through wire 5 to primary of coil being tested, thence through the primary winding and the wire 4 to vibrator spring B, contact screw D, wire 3, switch E and back to battery. If now the spur toothed wheel A is rotated as explained, the current flowing through the primary winding will be interrupted, thereby inducing a high tension jump spark current in the secondary winding which will appear at the variable spark gap X, J. The condenser C has one terminal permanently connected with the contact screw D through the wire 3. The other terminal is connected to the center or common terminal of the push button P. This center terminal of push button holds the condenser normally in contact with the upper contact 1 of push button. This places the condenser normally across wires 3 and 5. If the push button is depressed, the condenser is placed directly across the vibrator contacts through the lower contact 2 and wire 8. If the armature or coil being tested contains a condenser and said condenser is in good condition, a high tension spark may be obtained at gap X, J, when spur wheel is rotated with push button in contact with upper contact 1; but if condenser is defective or armature is not equipped with a condenser, it will be necessary to depress push button P so as to make contact with lower contact 2.

The object of the condenser, when used in connection with an interrupter placed in the primary circuit of any high tension or jump spark coil or winding, is two fold. First, it serves to reduce the arcing or sparking at the contact points of vibrator or interrupter (and thus prolongs the life of same by preventing undue pitting or burning of said points); and, secondly, the condenser by absorbing this arc or afterflow of current at interrupter points, produces an instantaneous break or interruption of the current flowing through the primary winding of the coil, which serves to greatly intensify the current induced in the secondary winding of said coil.

When a condenser is thus connected across, or in multiple with the exciting current flowing through the primary winding of any high tension winding, the said condenser will serve to greatly increase the intensity of the induced current in the secondary winding of coil or magneto. If the condenser were permanently connected in the usual manner in multiple with the interrupter, such as would be the case were the push button P depressed until it made contact with the lower contact 2, Fig. 1, the condenser would serve to replace or act in conjunction with the condenser of the coil being tested, so that if the condenser of said coil should be defective the high tension jump spark at gap would yet be good, the defective condenser being replaced by the condenser connected in multiple with the interrupter. But where the condenser is normally connected in multiple with the exciting current, as shown in Fig. 1, the said condenser serves to greatly intensify the high tension induced current produced by the coil or armature being tested; and yet, if the condenser contained in the said coil or armature should be defective the condenser placed in multiple with the exciting battery will not take the place of the defective condenser, and thus mislead the operator into the belief that the condenser of coil or armature being tested is in good condition. The condenser placed in multiple with the exciting current serves only as a booster to the condenser of said coil or armature. When the spring test clips 29 and 30 are connected to the primary winding of a coil or magneto armature having a self contained condenser connected across its primary, which is the usual practice, the said condenser is so far removed from the interrupter B, and the contact screw D, (where the break occurs) that the capacity of the said self contained condenser is greatly reduced. The circuit of the self contained condenser would be as follows:— one terminal 30, to the wire 5, the battery F, the switch E, the wire 3 to the contact screw D. The other terminal to the clip 29, the wire 4, and the vibrator B. It will thus be seen that the self contained condenser of coil is in multiple with the interrupter B, only through the wiring and exciting battery, all of which greatly lessen the action or capacity of the said condenser. By placing the condenser C, Fig. 1, normally in multiple with the exciting battery it will greatly overcome this loss of capacity of the coil condenser, and a much better spark will be produced at spark gap X J than would be possible without the said condenser C, thus connected in multiple with the exciting battery.

In testing a high tension winding by means of an electrically operated vibrator, which is the method commonly employed, the great difficulty is in obtaining a proper adjustment of said vibrator and in maintaining this adjustment. Furthermore if the tension of the vibrator spring is increased to a point where the flow of current through the vibrator and primary winding is sufficient to cause the greatest excitation so as to obtain the maximum jump spark at gap X, J, the magnetic attraction of core is not sufficient to overcome this tension of vibrator spring. This test is carried on by the armature test stand generally used by repairmen for testing high tension magneto armatures. It consists of a metal supporting frame or cradle for holding the magneto armature with the iron core of said armature in close proximity to a light spring vibrator of the conventional type. When the exciting current from battery traverses the primary winding of the magneto armature the iron core of said armature is magnetized and attracts the said spring vibrator, and thereby causes said vibrator to break contact with its contact screw, thus interrupting the current in the primary winding and inducing a high tension current in the secondary winding of the said magneto armature, the said secondary current appearing as a jump spark at a spark gap provided for this purpose. It will thus be seen that this arrangement makes a simple vibrating spark coil of the magneto armature.

Since the intensity of the secondary current depends largely on the amount (amperage) of current flowing through the primary winding, and since this flow is dependable on the amount of spring tension of the vibrator, the maximum excitation of primary and consequently the most intense secondary spark at gap would be obtained with a very stiff tension of vibrating spring. But were the vibrator adjusted to a tension that should give the maximum excitation of primary, the said vibrator spring would be far too stiff to be sufficiently attracted by magnetism of iron armature core to break contact with its contact screw and thus interrupt the current.

This defect is entirely overcome in a mechanical vibrator or interrupter, such as I claim and describe. In a mechanically operated vibrator such as I have described herein, it is possible to have a vibrator spring set at any desired tension and thus obtain the maximum spark at gap X, J, or subject winding to a breakdown test by widening said gap X, J, to a point where the high tension current can not jump said gap, but may jump through the winding if it should have a weak, defective or a badly insulated part.

It is obvious that those skilled in the art may vary the details of construction and arrangements of parts without departing from the spirit of my invention, and therefore I do not wish to be limited to such features except as may be required by the claims.

I claim:

1. An electrical testing device of the character described including a primary circuit containing a source of energy, an interrupter and terminals whereby to connect the primary circuit to a device to be tested, a condenser normally in multiple with the primary circuit, and means whereby said condenser may be switched into multiple with said interrupter and disconnected from the multiple connection with the interrupter whenever desired, substantially as described.

2. An improved electrical testing device comprising a primary circuit, an exciting source in said primary circuit, a condenser normally in multiple with the exciting source, an interrupter in said primary circuit in series with said exciting source and adapted to be vibrated at different frequencies to suit different instruments to be tested, means whereby said condenser may be placed in multiple with said interrupter, means whereby said primary circuit may be connected to an instrument to be tested, a secondary circuit, means whereby said secondary circuit may also be connected to an instrument to be tested, and a spark gap in said secondary circuit, substantially as described.

3. An improved electrical testing device comprising a primary circuit, a source of electrical energy in said primary circuit, an interrupter in said primary circuit, a condenser connected to one side of said primary circuit at one side of said interrupter, a lead connected to the other side of said primary circuit and having a contact point, a second lead connected to the first mentioned side of the primary circuit at the opposite side of said interrupter and also having a contact point, switch means permanently joined to said condenser and adapted to be moved against either of said contact points to place the condenser in multiple either with said source of energy or said interrupter, means whereby the primary circuit may be connected to an instrument to be tested, and a secondary circuit also adapted to be connected to an instrument to be tested and having an indicating device therein, substantially as described.

4. An improved electrical testing device comprising a primary circuit, a source of current therein, an interrupter in said circuit adapted to be vibrated at different frequencies to accommodate different instruments to be tested, a condenser connected to one side of said circuit between the source and said interrupter, leads connected respectively to the same side of said circuit on the opposite side of said interrupter and to the other side of said primary circuit, means whereby the other side of said condenser may be connected to either of said leads to place the condenser in multiple with either the source or said interrupter, flexible cables forming part of said primary circuit, test clips carried by the free ends of said cables and adapted to be applied to the terminals of an instrument to be tested, a secondary circuit connected to one side of said primary circuit, a test clip carried by the other end of said secondary circuit, and an adjustable spark gap in said secondary circuit, substantially as described.

In testimony whereof I affix my signature.

RICHARD C. BIERBOWER.